(12) United States Patent
Defilippis (10) Patent No.: US 8,180,014 B2
(45) Date of Patent: May 15, 2012

(54) TIERED TIE PLATES AND FUEL BUNDLES USING THE SAME

(75) Inventor: Michael S. Defilippis, Wilmington, NC (US)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 649 days.

(21) Appl. No.: 12/003,145

(22) Filed: Dec. 20, 2007

(65) Prior Publication Data

US 2012/0093275 A1    Apr. 19, 2012

(51) Int. Cl.
    *G21C 3/06*    (2006.01)
(52) U.S. Cl. ............... 376/453; 376/454; 376/438
(58) Field of Classification Search .............. 376/453, 376/454, 438
    See application file for complete search history.

(56) References Cited

U.S. PATENT DOCUMENTS

| | | | |
|---|---|---|---|
| 3,425,908 A * | 2/1969 | Michel et al. ................. | 376/440 |
| 3,741,868 A * | 6/1973 | Ikemoto ........................ | 376/440 |
| 3,864,211 A * | 2/1975 | King et al. .................... | 376/440 |
| 3,940,318 A | 2/1976 | Arino et al. | |
| 3,998,691 A | 12/1976 | Shikata et al. | |
| 4,038,137 A | 7/1977 | Pugh | |
| 4,196,047 A | 4/1980 | Mitchem et al. | |
| 4,284,472 A | 8/1981 | Pomares et al. | |
| 4,462,956 A | 7/1984 | Boiron et al. | |
| 4,474,727 A * | 10/1984 | Kmonk et al. ................ | 376/272 |
| 4,475,948 A | 10/1984 | Cawley et al. | |
| 4,493,813 A | 1/1985 | Loriot et al. | |
| 4,532,102 A | 7/1985 | Cawley | |
| 4,597,936 A | 7/1986 | Kaae | |
| 4,617,985 A | 10/1986 | Triggs et al. | |
| 4,632,804 A * | 12/1986 | Wallander et al. ............ | 376/444 |
| 4,655,995 A * | 4/1987 | Freeman et al. .............. | 376/267 |
| 4,663,111 A | 5/1987 | Kim et al. | |
| 4,663,118 A * | 5/1987 | Nelson .......................... | 376/445 |
| 4,729,903 A | 3/1988 | McGovern et al. | |
| 4,765,949 A * | 8/1988 | Denizou et al. ............... | 376/443 |
| 4,782,231 A | 11/1988 | Svoboda et al. | |
| 4,818,473 A * | 4/1989 | Lui ................................ | 376/261 |
| 4,844,861 A * | 7/1989 | Leclercq ....................... | 376/439 |
| 4,859,431 A | 8/1989 | Ehrhardt | |
| 5,053,186 A | 10/1991 | Vanderheyden et al. | |
| 5,145,636 A | 9/1992 | Vanderheyden et al. | |
| 5,282,233 A * | 1/1994 | Bryan ........................... | 376/451 |
| 5,355,394 A | 10/1994 | Van Geel et al. | |
| 5,400,375 A | 3/1995 | Suzuki et al. | |
| 5,513,226 A | 4/1996 | Baxter et al. | |

(Continued)

OTHER PUBLICATIONS

United States Office Action dated Jun. 25, 2010.

*Primary Examiner* — Ricardo Palabrica
(74) *Attorney, Agent, or Firm* — Harness, Dickey & Pierce, P.L.C.

(57) ABSTRACT

Example embodiments are directed to tiered tie plates and fuel bundles that use tiered tie plates. Example embodiment tie plates may include upper and lower tiered tie plates. Example embodiment tiered tie plates may have a plurality of bosses divided into groups, or tiers, having differing vertical (axial) displacement. Example embodiment fuel bundles may use tiered tie plates such that fuel rods in example bundles may originate and terminate at different vertical displacements, based upon the vertical displacement of the bosses receiving the fuel rods into the tiered tie plates. Optionally, shanks may be used to further vary fuel rod axial displacement and diameter.

12 Claims, 8 Drawing Sheets

U.S. PATENT DOCUMENTS

| | | | |
|---|---|---|---|
| 5,596,611 A | 1/1997 | Ball | |
| 5,615,238 A | 3/1997 | Wiencek et al. | |
| 5,633,900 A | 5/1997 | Hassal | |
| 5,682,409 A | 10/1997 | Caine | |
| 5,758,254 A | 5/1998 | Kawamura et al. | |
| 5,867,546 A | 2/1999 | Hassal | |
| 5,871,708 A | 2/1999 | Park et al. | |
| 5,910,971 A | 6/1999 | Ponomarev-Stepnoy et al. | |
| 5,949,839 A * | 9/1999 | Nylund | 376/438 |
| 6,056,929 A | 5/2000 | Hassal | |
| 6,160,862 A | 12/2000 | Wiencek et al. | |
| 6,192,095 B1 | 2/2001 | Sekine et al. | |
| 6,233,299 B1 | 5/2001 | Wakabayashi | |
| 6,456,680 B1 | 9/2002 | Abalin et al. | |
| 6,678,344 B2 | 1/2004 | O'Leary et al. | |
| 6,751,280 B2 | 6/2004 | Mirzadeh et al. | |
| 6,804,319 B1 | 10/2004 | Mirzadeh et al. | |
| 6,895,064 B2 | 5/2005 | Ritter | |
| 6,896,716 B1 | 5/2005 | Jones, Jr. | |
| 6,934,351 B2 * | 8/2005 | Reparaz | 376/434 |
| 7,157,061 B2 | 1/2007 | Meikrantz et al. | |
| 7,235,216 B2 | 6/2007 | Kiselev et al. | |
| 2002/0034275 A1 | 3/2002 | Abalin et al. | |
| 2003/0012325 A1 | 1/2003 | Kernert et al. | |
| 2003/0016775 A1 | 1/2003 | Jamriska, Sr. et al. | |
| 2003/0103896 A1 | 6/2003 | Smith | |
| 2003/0179844 A1 | 9/2003 | Filippone | |
| 2004/0091421 A1 | 5/2004 | Aston et al. | |
| 2004/0105520 A1 | 6/2004 | Carter | |
| 2004/0196942 A1 | 10/2004 | Mirzadeh et al. | |
| 2004/0196943 A1 | 10/2004 | Di Caprio | |
| 2005/0105666 A1 | 5/2005 | Mirzadeh et al. | |
| 2005/0118098 A1 | 6/2005 | Vincent et al. | |
| 2006/0062342 A1 | 3/2006 | Gonzalez Lepera et al. | |
| 2006/0126774 A1 | 6/2006 | Kim et al. | |
| 2007/0133731 A1 | 6/2007 | Fawcett et al. | |
| 2007/0133734 A1 | 6/2007 | Fawcett et al. | |
| 2007/0297554 A1 | 12/2007 | Lavie et al. | |
| 2008/0031811 A1 | 2/2008 | Ryu et al. | |
| 2008/0076957 A1 | 3/2008 | Adelman | |

* cited by examiner

TIERED TIE PLATES AND FUEL BUNDLES USING THE SAME

BACKGROUND

1. Field

Example embodiments generally relate to fuel structures and materials used in nuclear power plants.

2. Description of Related Art

Generally, nuclear power plants include a reactor core having fuel arranged therein to produce power by nuclear fission. A common design in U.S. nuclear power plants is to arrange fuel in a plurality of fuel rods bound together as a fuel assembly, or fuel bundle, placed within the reactor core. These fuel rods typically include several elements joining the fuel rods to assembly components at various axial locations throughout the assembly.

Figure 1:
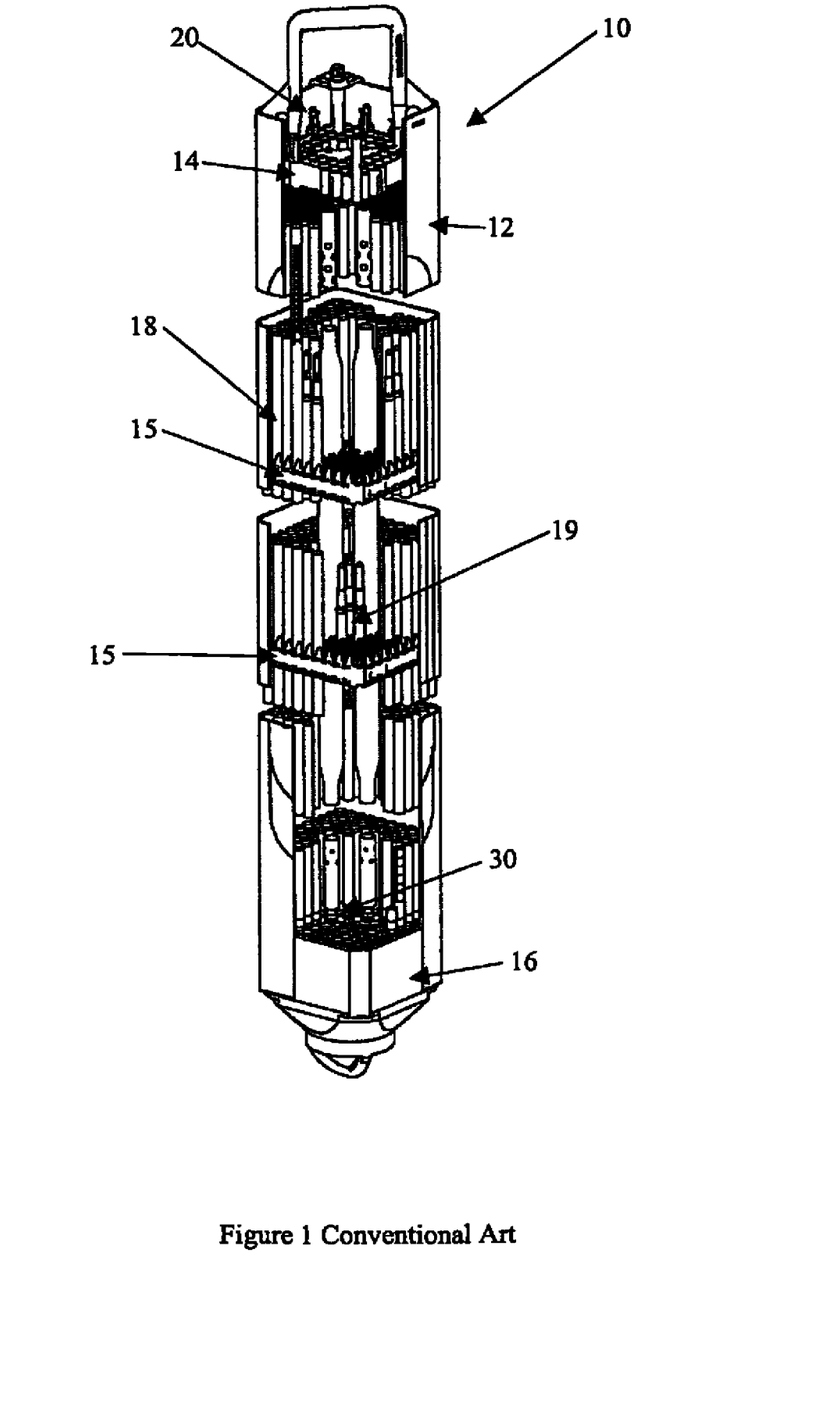
FIG. 1 is an illustration of a related art fuel assembly having flat tie plates affixed to fuel rods with shared vertical positions.

As shown in FIG. 1, a conventional fuel bundle 10 of a nuclear reactor, such as a BWR, may include an outer channel 12 surrounding an upper tie plate 14 and a lower tie plate 16. A plurality of full-length fuel rods 18 and/or part length fuel rods 19 may be arranged in a matrix within the fuel bundle 10 and pass through a plurality of spacers 15. Fuel rods 18 and 19 generally originate and terminate at the same vertical position, all rods continuously running the length of the fuel bundle 10, with the exception of part length rods 19, which all terminate at a lower vertical position from the full length rods 18. An upper end plug 20 and/or lower end plug 30 may join the fuel rods 18 and 19 to the upper and lower tie plates 14 and 16, with only the lower end plug 30 being used in the case of part length rods 19.

Figure 2A:
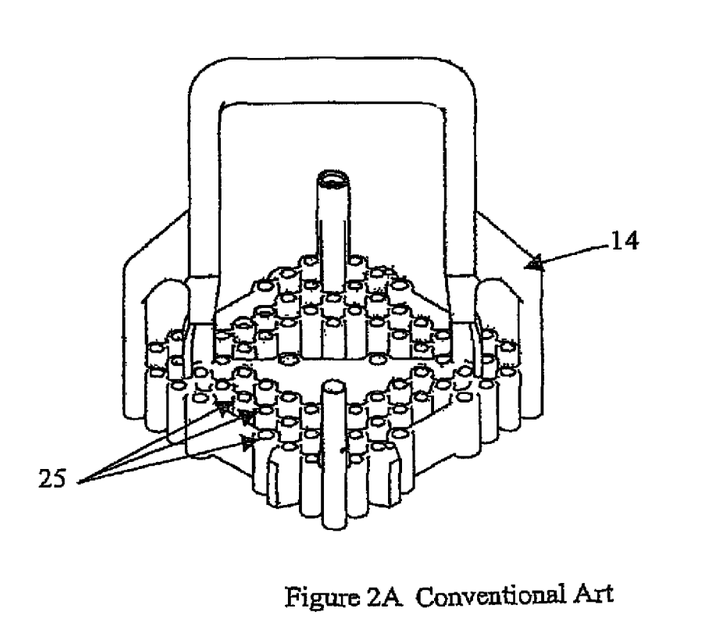
FIGS. 2A and 2B are illustrations of conventional flat upper and lower tie plates.
Figure 2B:
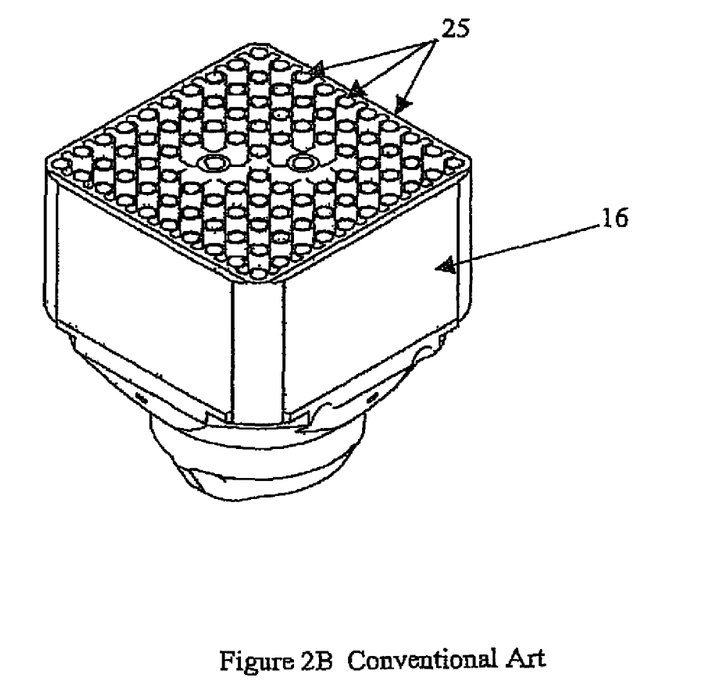

As shown in FIGS. 2A and 2B, conventional upper and lower tie plates 14 and 16 may be generally solid and flat. A plurality of holes, called bosses, 25 may receive lower end plugs of all rods in an assembly in the lower tie plate 16. Similarly, a plurality of bosses 25 may receive the upper end plug of all full-length rods in the upper tie plate 14. Part length rods may not terminate at a tie plate. In this way, upper and lower tie plates 14 and 16 may axially join fuel rods to the fuel assembly and hold fuel rods at a constant and shared axial displacement in the core. Because bosses and corresponding fuel rods may begin and/or terminate at the same axial position within the bundle, fluid flow may be restricted at these axial positions.

SUMMARY

Example embodiments are directed to tiered tie plates and fuel bundles that use tiered tie plates. Example embodiment tie plates may include upper and lower tiered tie plates. Example embodiment tiered tie plates may have a plurality of bosses divided into groups, or tiers, having differing vertical (axial) displacement. In this way, bosses may receive fuel rods at varying vertical displacements depending on how the bosses are grouped and displaced. Example embodiment tiered tie plates may reduce fluid flow pressure drop by increasing the minimum cross sectional flow area available through a fuel bundle.

Example embodiment fuel bundles may use tiered tie plates such that fuel rods in example bundles may originate and terminate at different vertical displacements, based upon the vertical displacement of the bosses receiving the fuel rods into the tiered tie plates. Alternatively, shanks may be used to further vary fuel rod axial displacement and diameter, allowing, for example, same-length fuel rods to originate at different axial displacements from a lower tiered tie plate and terminate at a shared axial displacement at an upper flat tie plate. In this way thermo-hydraulic characteristics of example embodiment fuel bundles may be modified based on the vertical displacement of rods and/or shanks placed therein.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 3:
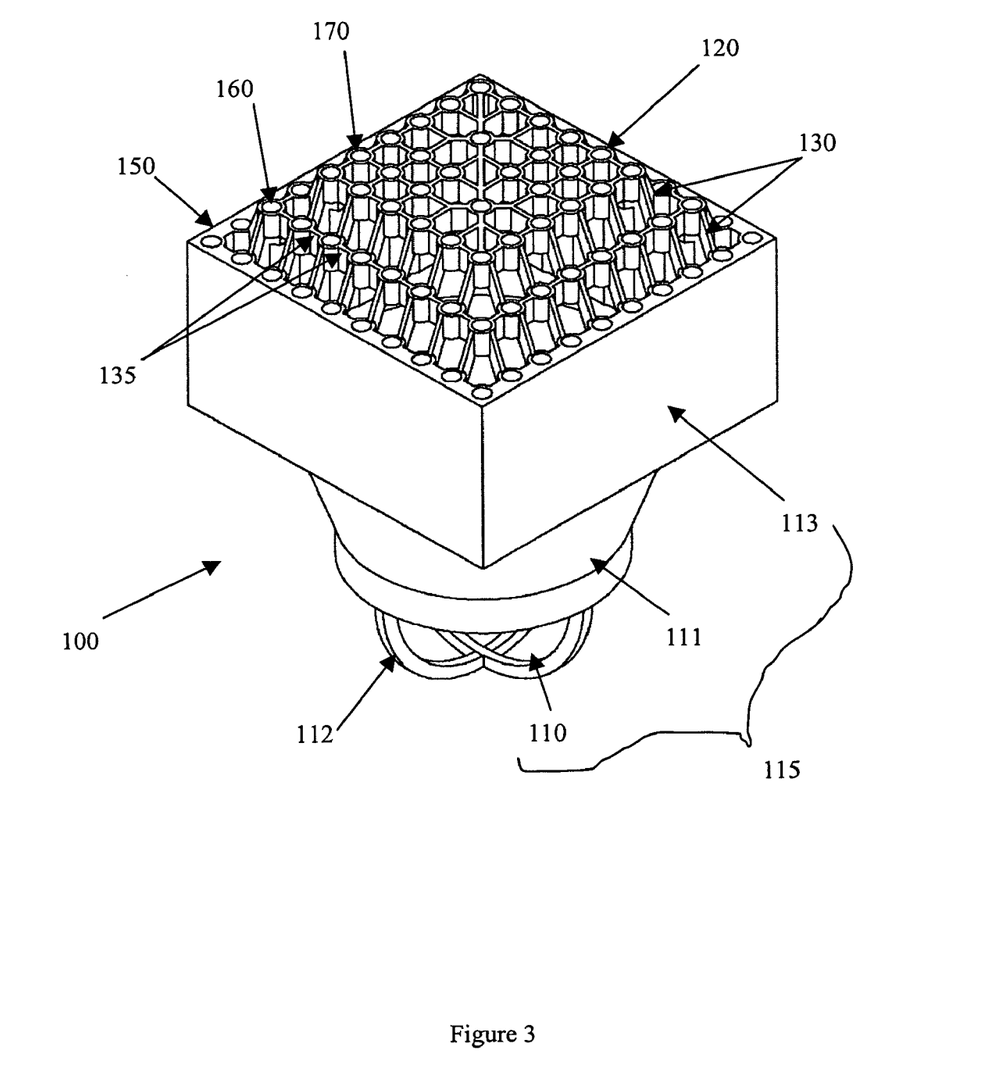
FIG. 3 is an illustration of an example embodiment tiered tie plate useable as a lower tiered tie plate.

FIG. 3 illustrates an example tiered tie plate 100 useable as a lower tiered tie plate. As shown in FIG. 3, example embodiment tiered tie plate 100 may include a body 115 having an inlet 110 configured to allow fluid coolant and/or moderator to pass into and through the body 115 of example tiered tie plate 100. Inlet 110 may take on a variety of configurations based on the application; for example, inlet 110 may include positioning and holding elements 112, shaped as hoops, that may retain the example embodiment tiered tie plate in a specific orientation and position relative to the core and other fuel structures. Inlet 110 may connect to a nozzle 111 that permits fluid flow to pass into a midsection 113. Midsection 113, while shown as hexahedral in FIG. 3, may be shaped in any form depending on the application and may include conventional flow-mixing and conditioning equipment. Inlet 110, nozzle 111, and midsection 113 may make up the body 115 of example embodiment tiered tie plate 110.

Example embodiment tiered tie plate 100 further includes bosses 120 defining holes shaped to receive ends or end plugs of nuclear fuel useable with example embodiment tiered tie plates. In this embodiment, the bosses 120 are annular. Axial support members 130 may connect the bosses 120 to each other and to the body 115 of the example embodiment tiered tie plate 100. Some bosses 120 may be integrated into the body 115 midsection 113. Lateral support members 135 may connect the bosses 120 to each other in a transverse direction perpendicular to the axial (vertical) direction. The bosses 120 may be spaced at a desired interval. For example, bosses 120 may be spaced in a square lattice formation with axial and lateral support members 130 and 135 extending at least transversely from each boss 120 at 90-degree intervals, as shown in FIG. 3, or bosses 120 and support members 130 and 135 may be spaced radially, triangularly, etc., depending on where fuel rods may be placed in the assembly. Similarly, bosses 120 and support members 130 and 135 are not necessarily spaced at regular intervals. Bosses 120 and axial and lateral support members 130 and 135 may be omitted over larger intervals to allow for other components or flow to pass through example embodiment tiered spacer 100. For example, some or all bosses 120 may be omitted, resulting in intersecting members 130 and 135, and an alternative fuel end plug may be used.

Axial and lateral support members 130 and 135 are shown with thin transverse profiles so as to form several flow areas through example embodiment tiered tie plate 100. In this way fluid may pass through the inlet 110 and out around the bosses 120. While support members 130 and 135 are shown as thin extending members, any connection between bosses 120 and body 115 that permits flow through the example embodiment tiered tie plate may be used. As shown in FIG. 3, bosses 120 are positioned at a plurality of vertical (axial) displacements, called tiers. At a first vertical displacement is tier 150, at a second vertical displacement is tier 160, and at a third vertical displacement is tier 170. Each tier 150, 160, and 170 may contain a plurality of bosses 120, so that different bosses 120 occupy different tiers 150, 160, or 170. Axial support members 130 may permit bosses 120 to occupy different vertical displacements by extending diagonally in both a transverse and axial direction. For example, axial support members 130 may have a parallelogram cross-section, as shown in FIG. 3.

Although three different tiers are shown in FIG. 3, example embodiment tiered tie plates may include more distinct tiers, limited only by the number of bosses 120, such that each boss 120 may have its own tier. Further, although FIG. 3 shows tiers 150, 160, and 170 each having bosses 120 continually and laterally joined in a square pattern by lateral and axial support members 130 and 135, tiers in example embodiment plates need not have all continuous and/or joined bosses 120.

By locating bosses 120 at different tiers of vertical displacement, example embodiment tiered tie plates may receive and hold nuclear fuel at several different axial displacements relative to each other. Several different three-dimensional configurations of bosses 120 and fuel rods may be possible with example embodiment tiered tie plates, due to the ability of the bosses 120 to be placed at any combination of different transverse and axial positions.

Figure 4:
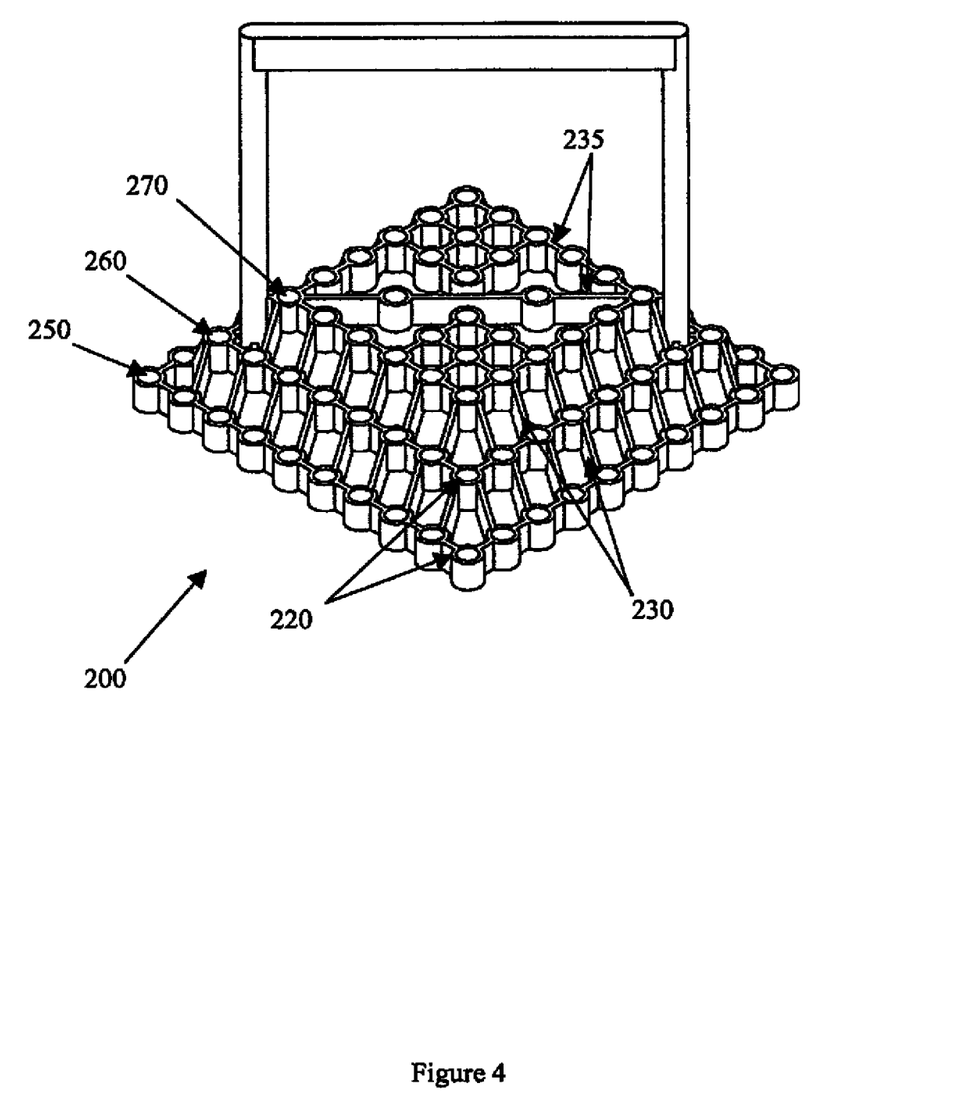
FIG. 4 is an illustration of an example embodiment tiered tie plate useable as an upper tiered tie plate.

FIG. 4 is an illustration of another example embodiment tiered tie plate 200 that may be used as an upper tiered tie plate. As shown in FIG. 3, example embodiment tiered tie plate 200 may share several elements with previously described example embodiment tiered tie plate 100, whose redundant description is omitted. Tiered tie plate 200 may include bosses 220 joined by axial and lateral support members 230 and 235 similar to the description of FIG. 3. Also, bosses 220 may be at a plurality of different axial displacements, or tiers, 250, 260, or 270.

However, example embodiment tiered tie plate 200 may lack any body or lower inlet, and fluid may flow through and around bosses 220 and support members 230 and 235. Example embodiment tiered tie plate 200 may include a handle 240 to facilitate handling and moving example embodiment fuel bundles including example embodiment tiered tie plate 200.

FIG. 4 shows example embodiment tiered tie plate 200 having three tiers 250, 260, 270 with different axial displacements and a square lattice of bosses 220 at each tier. Tiers 250, 260, and 270 may correspond in relative axial displacement and boss position to tiers 150, 160, and 170 and their associated boss 120 position. In this way, as described below, example embodiment fuel bundles may use two example embodiment upper and lower tiered tie plates 200 and 100 with several fuel elements or rods of a single length, with each rod equally seating in bosses 120 and 220 of example embodiment tiered tie plates.

Example embodiment tiered tie plates may be fabricated from a material that provides sufficient material strength to support fuel rods in different axial positions with bosses 120/220 and support members 130/135/230/235 and that substantially retains its physical characteristics in an operating nuclear reactor environment. For example, zirconium-aluminum alloys, stainless steel alloys, etc., may be used to fabricate example embodiment tiered tie plates.

Figure 5:
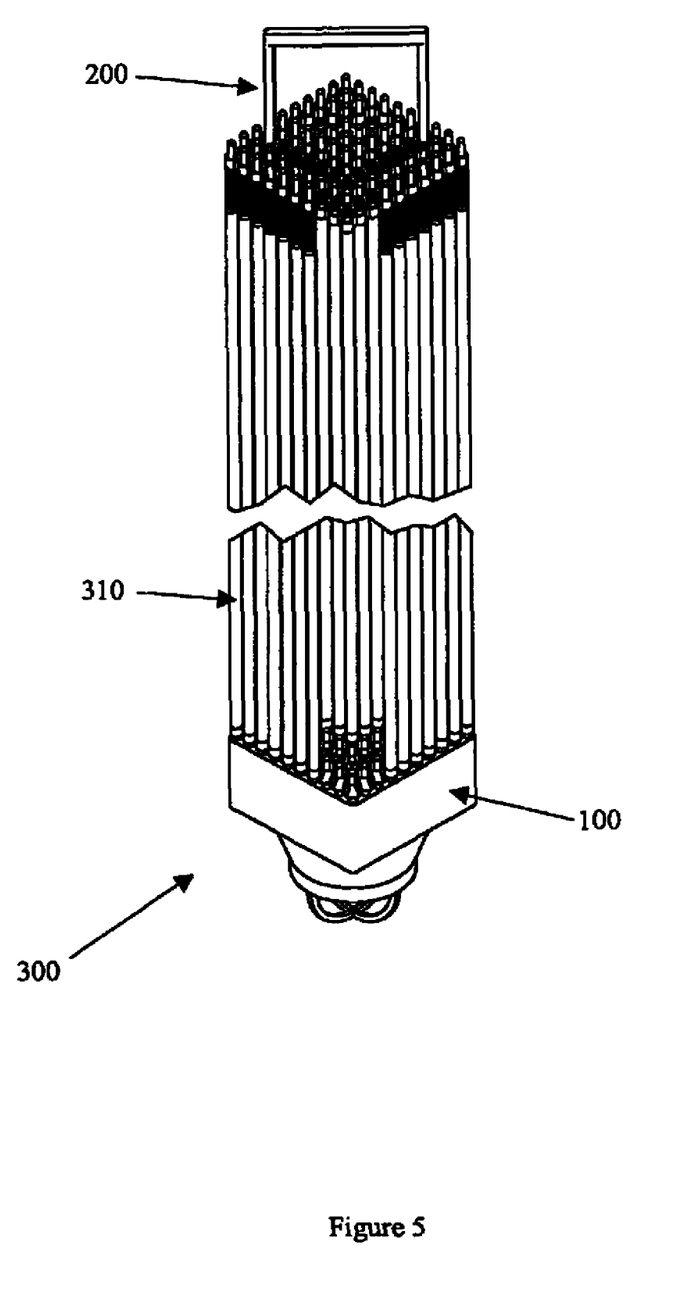
FIG. 5 is an illustration of an example embodiment fuel assembly using a lower tiered tie plate.

As shown in FIG. 5, example embodiment fuel assembly 300 may use example embodiment tiered tie plates 100 and 200 as lower and upper tie plates, respectively. Several fuel rods 310 may seated at both ends in example embodiment tiered tie plates 100 and 200, such that the tie plates 100 and 200 join the fuel rods 310 together and to the example embodiment assembly 300. Other fuel rod designs and conventional features, such as spacers and end plugs, may be used in conjunction with example embodiment fuel assembly 300.

Because example embodiment tie plates 100 and 200 may have complementary tiers and bosses, fuel rods 310, while rigidly attached to fuel assembly 300, may be at different axial displacements corresponding to the different tiers of example embodiment tiered tie plates 100 and 200 as described above. Further, fuel rods 310 may all have a same length due to the mirrored axial displacement configuration between example embodiment tie plates 100 and 200. In this way, example embodiment fuel assembly 300 may have various three-dimensional configurations for fuel rod 310 starting and terminating points at either end of the assembly.

Although example embodiment fuel bundles are shown with the same three-tiered configuration described with respect to example embodiment tiered tie plates, different tier and different corresponding rod configurations may be used in example embodiment bundle designs, depending on the thermo-hydraulic and nuclear properties of the bundle to be affected.

Example embodiment fuel bundles may use less than two example embodiment tiered tie plates. Conventional flat tie plates may be used in example bundles through the use of rod shanks or multiple length fuel rods that account for the difference between a conventional flat tie plate and an example embodiment tiered tie plate.

Figure 6:
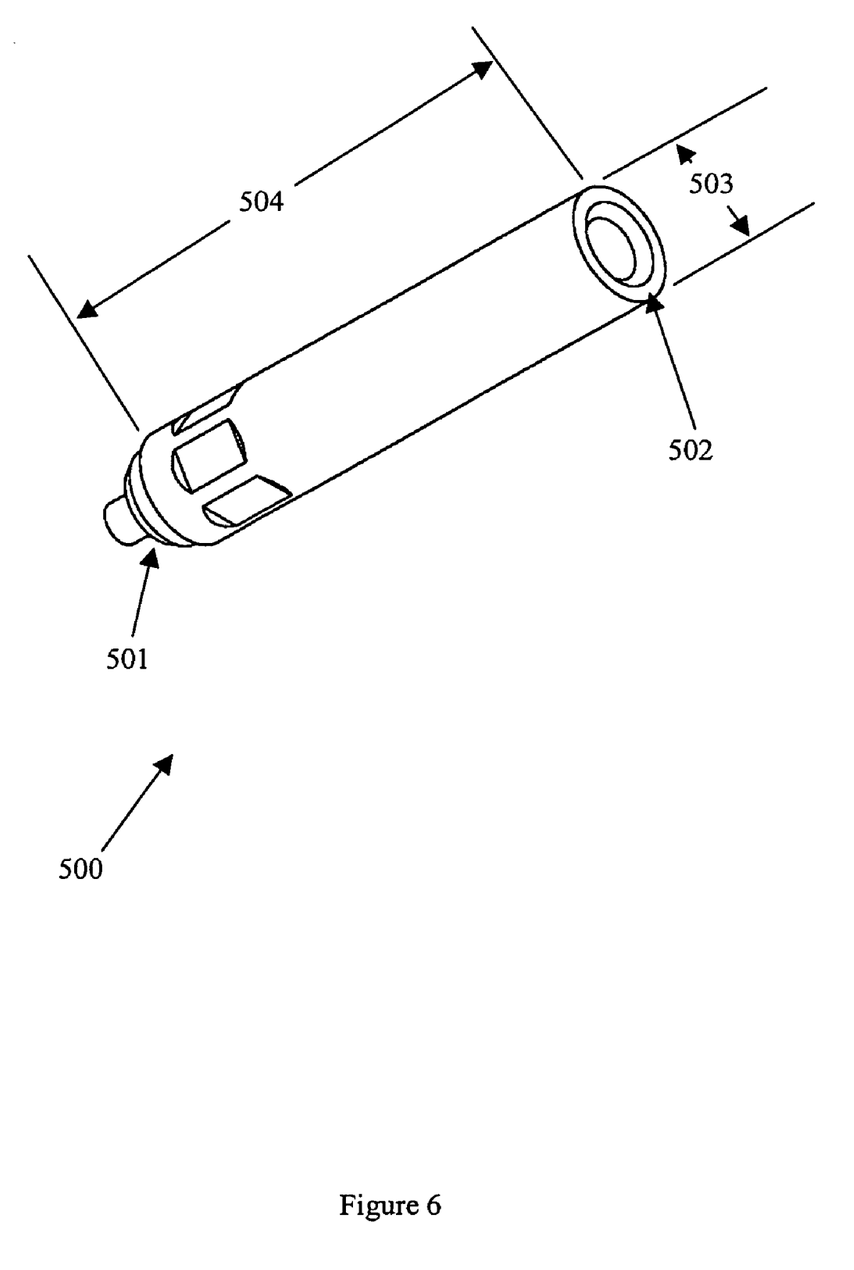
FIG. 6 is an illustration of a shank useable with example embodiment fuel assemblies and tiered tie plates.

An example shank 500 is shown in FIG. 6. Example shanks 500 may be generally cylindrical so as to present a continuous exterior when joined with fuel rods in example embodiment fuel bundles. Alternatively, example shanks may have a variety of shapes depending on the fuel shape and desired flow characteristics around example shanks. Example shank 500 may have a receptive end 502 and an insertive end 501. Receptive end 502 may join through several known connection means, including a screw and threaded hole, to a fuel rod. Insertive end 501 may be seated in an example embodiment tiered tie plate or conventional tie plate in the same manner that a fuel rod would so seat.

Example shank 500 may have a length 504 equal to a displacement between tiers and a body of example embodiment tiered tie plates. In this way, example shanks may attach to some of the fuel rods seated at an opposite end in example embodiment tiered tie plates and account for the differences in axial displacement and rod termination caused by the tiers. Conventional flat tie plates may then be equally seated against each example shank and fuel rod despite the different axial displacements of the rods.

Example shank 500 may have a diameter 503 that presents a continuous outer boundary with any fuel rod it may be attached to. Alternatively, diameter 503 may be decreased to less than that of any fuel rod attached to example shank 500. In this way, example embodiment fuel bundles using example shanks 500 with smaller diameters may have decreased fluid coolant pressure drop and require less pumping head. Diameter 503 may be varied and shaped in other ways depending on the desired thermo-hydraulic characteristics of example embodiment fuel bundles.

Figure 7:
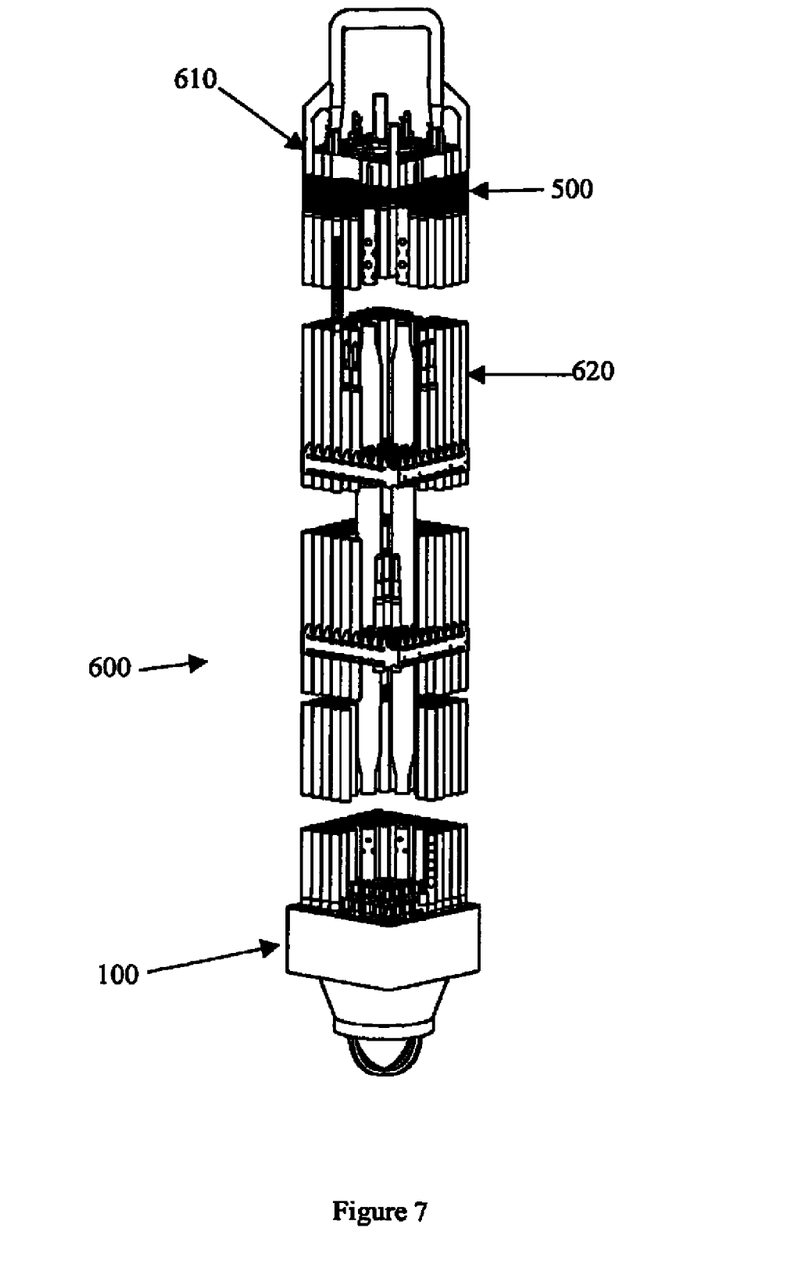
FIG. 7 is an illustration of an example embodiment fuel assembly using a lower tiered tie plate with shanks.

FIG. 7 shows an example embodiment fuel bundle 600 using one example embodiment tiered tie plate 100 as a lower tie plate and a conventional or otherwise flat upper tie plate 610. Fuel rods 620 may be positioned between the two tie plates 100 and 610. Because example embodiment tiered tie plate 100 may have varied vertical displacement of its bosses and corresponding starting position of lower fuel rods 620, fuel rods 620 may terminate at different vertical displacements. Example shanks 500 may compensate for these differing terminal vertical displacements in the fuel rods 620 and present a planar termination at flat tie plate 610. In this way, example embodiment fuel bundles may use fuel rods of a single length with example embodiment tiered tie plate as a lower tie plate while still presenting a conventional flat upper tie plate for compatibility with conventional core structures requiring a flat upper tie plate. Also, as shown in FIG. 7, diameters of example shanks 500 may be varied throughout the example bundle 600.

Figure 8:
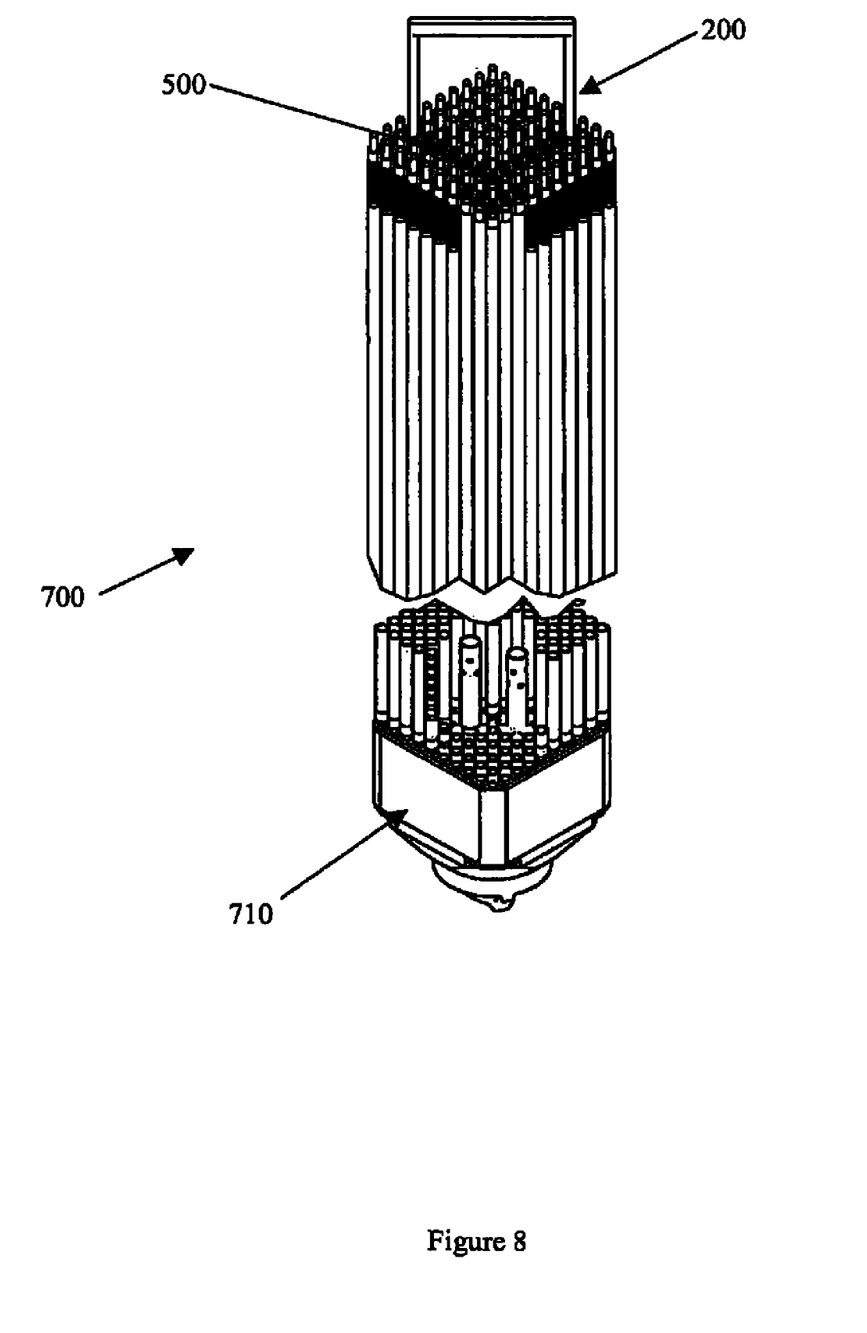
FIG. 8 is an illustration of an example embodiment fuel assembly using an upper tiered tie plate with shanks.

FIG. 8 shows another example embodiment fuel bundle 700 using one example embodiment tiered tie plate 200 as an upper tie plate and a conventional or otherwise flat lower tie plate 710. Similarly to FIG. 7, example shanks 500 may compensate for the axial differences between example embodiment upper tiered tie plate and the lower flat tie plate.

Example embodiment fuel bundles may thus possess fuel rods that originate and/or terminate at differing axial (or vertical) discplacements. As such, fluid flow through example embodiment fuel bundles may not be subject to a dramatic pressure drop at example embodiment upper and lower tiered tie plates, because example embodiment tiered tie plates essentially present a larger flow cross-section. Further, example shanks of smaller diameters may decrease pressure drop by similarly increasing flow cross-section and hydraulic diameter. In this way, example embodiments may improve hydrodynamic flow properties through an operating nuclear core and reduce pumping energy consumed.

Example embodiments thus being described, it will be appreciated by one skilled in the art that example embodiments may be varied through routine experimentation and without further inventive activity. For example, other fuel types, shapes, and configurations may be used in conjunction with example embodiment fuel bundles and tiered tie plates. Variations are not to be regarded as departure from the spirit and scope of the exemplary embodiments, and all such modifications as would be obvious to one skilled in the art are intended to be included within the scope of the following claims.

What is claimed is:

1. A nuclear fuel bundle comprising:
   a lower tie plate;
   an upper tie plate;
   the lower tie plate having a plurality of annular bosses positioned in two tiers in a honeycomb matrix, each boss being a cylindrical tube configured to receive an end of a nuclear fuel rod, the first and second tier of bosses having substantially different axial displacements; and
   a plurality of fuel rods between the lower tie plate and the upper tie plate;
   axial supports, on the lower tie plate, connecting the first tier of bosses to the second tier of bosses, each axial support extending downward from the second tier to the first tier with a first end connected to a first boss of the first tier of bosses and a second end connected to a second boss of the second tier of bosses.

2. The nuclear fuel bundle of claim 1, further comprising:
   at least one shank connected between the end of the nuclear fuel rod and one of the upper tie plate and the lower tie plate, the one of the upper tie plate and the lower tie plate having bosses with a substantially same axial displacement.

3. The nuclear fuel bundle of claim 2, wherein each of the at least one shank has a length corresponding to a difference between the different axial displacements of the first portion and the second portion of the plurality of fuel bosses, such that the plurality of fuel rods may have a common length.

4. The nuclear fuel bundle of claim 2, wherein each of the at least one shank has an outer diameter substantially equal to an outer diameter of the nuclear fuel rod to which the at least one shank is attached.

5. The nuclear fuel bundle of claim 2, wherein the at least one shank has a diameter not substantially equal to an outer diameter of the nuclear fuel rod to which the at least one shank is attached.

6. A nuclear fuel bundle comprising:
a lower tie plate having a plurality of bosses;
an upper tie plate having a plurality of bosses; and
a plurality of fuel rods extending axially between the lower tie plate and the upper tie plate, each of the fuel rods being supported by one of the bosses of the lower tie plate and by a corresponding one of the bosses of the upper tie plate,
  at least a first portion of the plurality of bosses in the lower tie plate having a substantially different axial position than a second portion of the plurality of bosses in the lower tie plate such that fuel rods extending between the first portion of bosses in the lower tie plate and corresponding bosses in the upper tie plate originate and/or terminate at a different axial displacement than fuel rods extending between the second portion of bosses in the lower tie place and corresponding bosses in the upper tie plate,
  axial supports, connecting the first portion of bosses to the second portion of bosses in the lower tie plate, each axial support extending downward from the second tier to the first tier with a first end connected to a first boss of the first portion of bosses and a second end connected to a second boss of the second portion of bosses.

7. The nuclear fuel bundle of claim 6, further comprising:
at least one shank connected between the end of one of the nuclear fuel rods and the upper tie plate, the upper tie plate having bossed with a substantially same axial displacement.

8. The nuclear fuel bundle of claim 7, wherein the at least one shank has a diameter not substantially equal to an outer diameter of the nuclear fuel rod to which the at least one shank is attached.

9. The nuclear fuel bundle of claim 7, wherein the each of the fuel rods are supported by one of the bosses of the lower tie plate by seating into and originating in one of the bosses.

10. The nuclear fuel bundle of claim 1, wherein the first end of each axial support is connected along a longitudinal length of the first boss and the second end of each axial support is connected along a longitudinal length of the second boss.

11. The nuclear fuel bundle of claim 6, wherein the first end of each axial support is connected along a longitudinal length of the first boss and the second end of each axial support is connected along a longitudinal length of the second boss.

12. The nuclear fuel bundle of claim 10, wherein,
each axial support has a parallelogram shape,
each axial support extends diagonally, as compared to a horizontal cross section of the tie plate, from the first tier to the second tier, the horizontal cross section being a plane that is perpendicular to a fluid flow through the tie plate.

* * * * *

UNITED STATES PATENT AND TRADEMARK OFFICE
CERTIFICATE OF CORRECTION

| | | |
|---|---|---|
| PATENT NO. | : 8,180,014 B2 | Page 1 of 1 |
| APPLICATION NO. | : 12/003145 | |
| DATED | : May 15, 2012 | |
| INVENTOR(S) | : Michael S. Defilippis | |

It is certified that error appears in the above-identified patent and that said Letters Patent is hereby corrected as shown below:

Column 6, line 12 reads:

vertical) discplacements. As such, fluid flow through example

Column 6, line 12 should read:

vertical) displacements. As such, fluid flow through example

Signed and Sealed this
Twenty-seventh Day of November, 2012

David J. Kappos
*Director of the United States Patent and Trademark Office*